June 20, 1967
J. R. G. BRYCE — 3,326,743
METHOD FOR CONTINUOUSLY REMOVING EXUDED BLACK LIQUOR FROM CELLULOSIC MATERIALS DURING VAPOR PHASE DIGESTION
Filed July 14, 1964
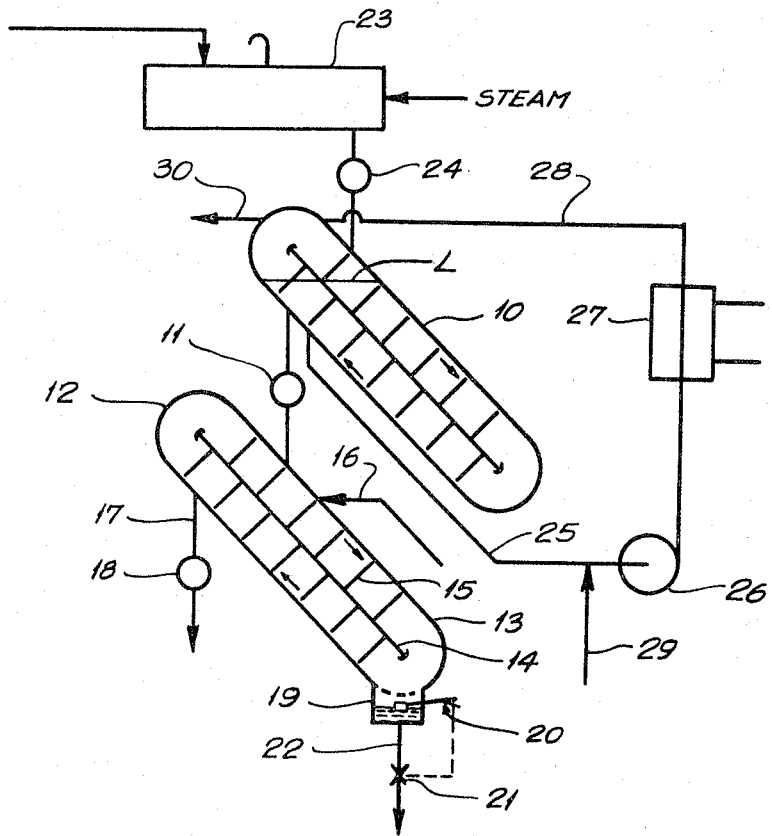
INVENTOR
John R.G. BRYCE
AGENT 3,326,743
METHOD FOR CONTINUOUSLY REMOVING EXUDED BLACK LIQUOR FROM CELLULOSIC MATERIALS DURING VAPOR PHASE DIGESTION
John R. G. Bryce, Pointe Claire, Quebec, Canada, assignor to Domtar Limited, Montreal, Quebec, Canada, a company of Canada
Filed July 14, 1964, Ser. No. 382,473
2 Claims. (Cl. 162—19)

This invention relates to cooking of wood chips. More particularly, it is directed to a method and apparatus for continuously removing some spent black liquor during the cooking stage when cooking in vapour phase.

In vapour phase digestion, the chips are pre-steamed in order to remove any air, and then impregnated with the cooking liquor. The concentration of this liquor is controlled so that at the end of the impregnation period the chips contain within their structure sufficient cooking reagent to complete the digestion. Following the impregnation, the chips are separated from the free liquor, and rapidly brought to the cooking temperature. At the end of the cooking period, the pressure is reduced to atmospheric and the pulp thus formed is separated from the spent liquor.

It is an object of this invention to provide a simple method and apparatus for removing a substantial portion of the black liquor from the digester during cooking.

Another object of the invention is to provide a system of removing black liquor of a relatively high percentage of solid content from the digester.

Applicant has found that as delignification proceeds, the chips shrink in size and black liquor drains from the shrinking chips and this black liquor may readily be removed from the digester. The amount of black liquor that may be drained from the digester is appreciable and may be as high as about 55% of the total black liquor, the average being about 40%.

Broadly, the present invention relates to a method and apparatus for continuously removing black liquor during cooking in the vapour phase. More specifically, there is provided drain means for black liquor from a vapour phase digester which is at a lower level than the digested stock outlet.

Further features and advantages will be apparent from the following detailed description taken in conjunction with the accompanying drawing.

The drawing is a schematic view of one form of the invention.

In the drawing, there is shown an impregnation tube 10 where the chips are impregnated with the required amount of liquor. As the method of impregnation is not critical in carrying out the instant invention, no specific means for impregnating have been described. One suitable system for impregnating is disclosed in co-pending Canadian application No. 860,584 filed Oct. 20, 1962, by George H. Tomlinson II. In the system of the above application, chips pass through a constant environment of controlled concentration, at a controlled temperature and during a controlled time to maintain a proper amount of reagent in the chips entering the digester.

From the impregnation tube 10, the chips pass through a rotary valve 11 and from there into the cooking tube 12, which is maintained at cooking temperature by injected steam. The cooking tube in the illustrated embodiment includes a cylindrical tube 13 having closed ends and provided with a central mid-feather 14. A flight type conveyor schematically illustrated as 15 extends the length of the tube 13 and around said mid-feather to convey the chips as the cooking operation proceeds downwardly along the upper side of the mid-feather 14 and upwardly along the under side of said mid-feather. High pressure steam is injected into the tube 13 through the line 16 to provide the required temperature in the cooking tube. Cooked chips are removed from the cooker via line 17 and proceed to subsequent equipment such as a blow tank through the rotary valve 18. It will be noted that the rotary valves 11 and 18 effectively isolate the cooking tube 12 from the remainder of the pulping system. Thus, the chips are cooked in the vapour phase.

A chamber 19 is provided adjacent the bottom of the digester 12 into which liquor from the digester drains. This chamber 19 has a level control means such as a float 20 which controls valve 21 in the drain line 22 to eliminate any possibility of the tube 12 being vented. Any suitable means may be provided to prevent venting of the digester.

No specific type of digester is required for carrying out the instant invention as long as the impregnated chips are cooked in the vapour phase and a drain is provided below the chip outlet at a point in the cooking vessel where the black liquor may be drained.

Thus, applicant's invention requires that a drain be provided in a vapour phase digester below the chip outlet and be located in a convenient position to allow the black liquor to drain from digester. The most convenient location of such drain from the point of view of ease of drainage is at the bottom of the cooking chamber.

The following is one example of the operation of the invention when used with a Kraft process on a continuous type vapour phase digester. All weights, unless otherwise specified, are given in lbs./tons pulp unbleached 90% dry basis.

4,090 lbs. of M.F. wood and bark and 2,730 lbs. of $H_2O$ (i.e., wood with 40% moisture) is fed into a pre-steamer schematically illustrated at 23 in FIG. 1, 700 lbs. of steam are used in the pre-steamer and 4,090 lbs. of wood and 3,430 lbs. of $H_2O$ at 212° F. proceed to the impregnator 10 via the rotary valve 24.

In the impregnator tube 10, the chips are impregnated with liquor as more fully described in said co-pending Canadian application No. 860,584 filed Oct. 20, 1962, by George H. Tomlinson II. A temperature of 282° F. is maintained in tube 10 by re-circulation of liquor via piping 25, pump 26, heat exchanger 27 and piping 28 back to the tube 10. The heat exchanger 27 raises the temperature of the re-circulating liquor to 311° F. This recirculating liquor has a ratio of 15 to 1 in this example (15 parts re-circulation liquor to 1 part make up liquor) with the liquor entering the tube 10 at a concentration of 33.7 grams/litre and removed therefrom at a concentration of 30.5 grams/litre and with the make up liquor having a concentration of 90 grams/litre at a temperature of 282° F. The required amount of make up liquor is added via line 29.

Under the above conditions, 2,400 lbs. of process steam at 35 p.s.i.g. produced by flashing of liquor injected into the impregnator are removed from the tube 10 via line 30. This process steam may be utilized in other mill operations, for example, in the multiple effect evaporators. By controlling the temperature of the re-circulated liquor in accordance with the level L in the impregnator to cause more or less flashing the level L can be held substantially constant as is fully described in the above referred to application.

From the impregnator 10, the impregnated chips proceed through the valve 11 into the digester 12. A temperature of 365° F. is maintained in the tube 12 with the injection of 1,135 lbs. of high pressure steam to thereby cook the chips in the vapour phase. 4,920 lbs. of black liquor at 365° F. with a solids content of 26% is drained from the digester via line 22 and conducted to a recovery system. 1,840 lbs. of pulp carrying 4,920 lbs. of black liquor is removed via line 17. This pulp is washed and the black liquor from washing is also conducted to the recovery system.

It will be noted that with applicant's drain system, a considerable percentage of the black liquor is drained from the digester and this drained black liquor has a high (in the above example 26%) solids content.

Thus, applicant has disclosed a system of cooking chips in the vapour phase while at the same time removing black liquor therefrom.

I claim:

1. In a continuous process for vapour phase digestion cellulosic materials wherein said materials carrying sufficient chemical for subsequent digestion are continuously cooked in a cooking zone in a steam atmosphere and wherein spent liquor is exuded from said materials as said materials are digested the improvement comprising; collecting said spent liquor in a lower part of said cooking zone, then continuously removing said spent liquor from said cooking zone and separately continuously removing digested cellulosic material from said cooking zone whereby said spent liquor and said digested cellulosic material are separated in said cooking zone.

2. A continuous method of vapour phase digestion of cellulosic material in a digestion zone having a drain outlet and a pulp outlet comprising; impregnating said cellulosic material with a sufficient amount of a digestion chemical for subsequent digestion, continuously introducing the impregnated cellulosic material free of excess digestion chemical into said digestion zone, cooking said cellulosic material in said digestion zone in a vapour atmosphere whereby spent liquor is exuded from said cellulosic material in said digestion zone, collecting said spent liquor in said digestion zone, and then simultaneously and continuously removing from said digestion zone exuded spent liquor via said drain outlet and cooked cellulosic material via said pulp outlet.

References Cited
UNITED STATES PATENTS 2,858,213 10/1958 Durant et al. _____ 162—17
3,135,651 6/1964 Starrett _____ 162—17

S. LEON BASHORE, *Primary Examiner.*

DONALL H. SYLVESTER, *Examiner.*